Figures 1, 2, 3:
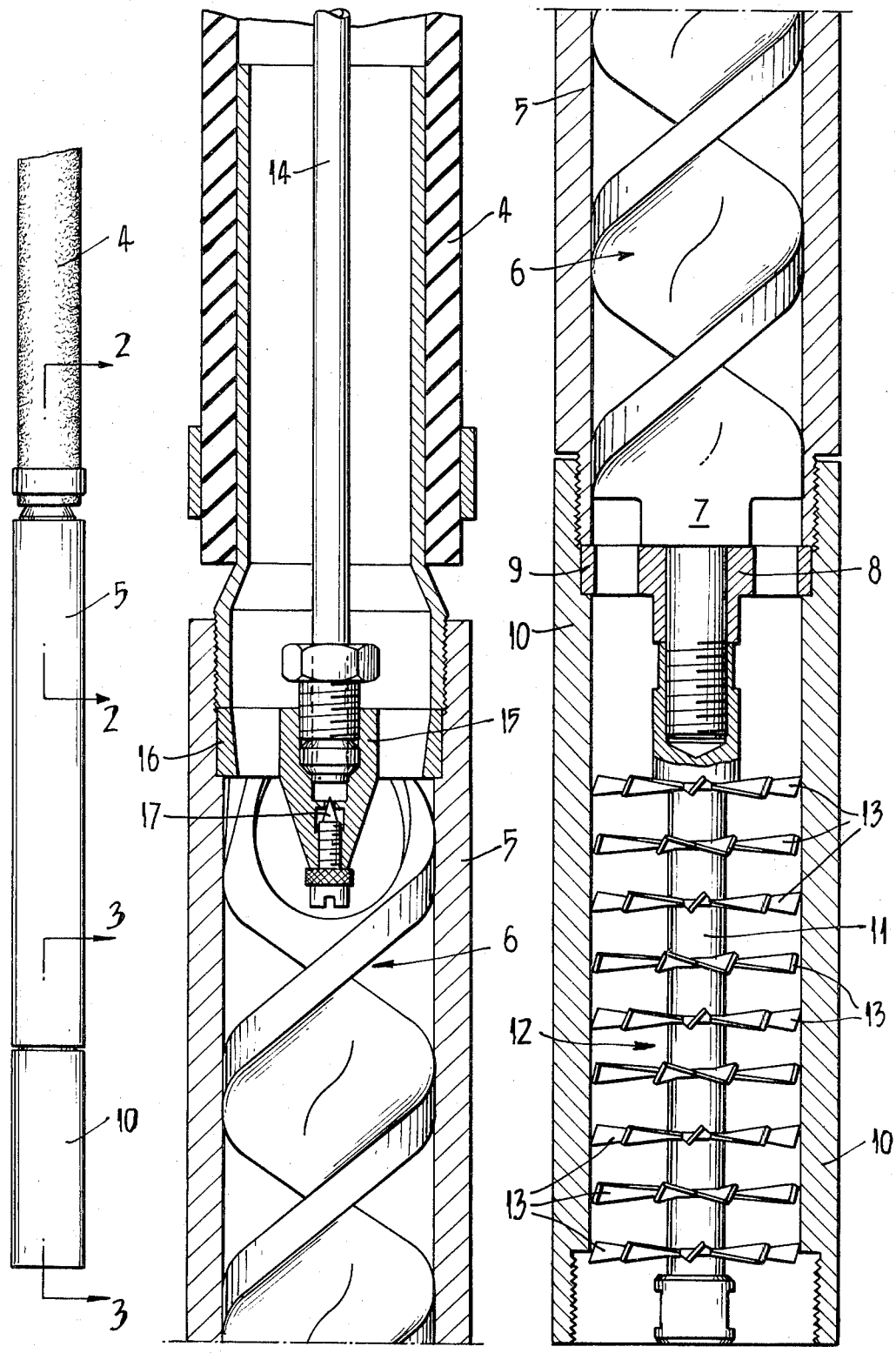

United States Patent [19]
Wisinski

[11] 3,848,507
[45] Nov. 19, 1974

[54] PIPELINE FOR DELIVERING CROSS-LINKED SLURRIED EXPLOSIVES

[75] Inventor: Adam Prus Wisinski, Parkdale, Australia

[73] Assignee: ICI Australia Limited, Melbourne, Victoria, Australia

[22] Filed: Oct. 27, 1972

[21] Appl. No.: 301,520

[30] Foreign Application Priority Data
Nov. 12, 1971  Australia............................. 7013/71

[52] U.S. Cl....................... 86/1 R, 86/20 C, 259/4
[51] Int. Cl............................................ C06b 21/02
[58] Field of Search............ 86/1 R, 20 C; 259/4, 18

[56] References Cited
UNITED STATES PATENTS
2,802,648   8/1957   Christensen et al.................. 259/18
3,424,438   1/1969   Knotts et al............................ 259/4
3,523,048   8/1970   Hopler, Jr......................... 149/60 X
3,664,638   5/1972   Grout et al............................ 259/4

FOREIGN PATENTS OR APPLICATIONS
530,206   9/1956   Canada................................. 259/4

Primary Examiner—Leland A. Sebastian
Attorney, Agent, or Firm—Cushman, Darby & Cushman

[57] ABSTRACT

An explosive slurry is supplied to a bore hole through a pipeline which includes an extension at its discharge end, the extension containing a turbine which is turned by the flow of slurry and also containing a stirrer rotated by the turbine. Cross-linking agent is supplied to the stirrer through a small-diameter inner tube disposed within the pipeline so as to be mixed with explosive slurry free of cross-linking agent.

2 Claims, 3 Drawing Figures

PATENTED NOV 19 1974　　　　　　　　　　　　　　3,848,507

PIPELINE FOR DELIVERING CROSS-LINKED SLURRIED EXPLOSIVES

It is common practice to supply explosive slurries to boreholes through flexible pipelines, often of internal diameter as small as 2 or 3 cm. As the pipe-lines may be 100 m. or more in length, and as the slurries often include cross-linking agents to cause them to gel in order to minimise the effect of water in the borehole, the slurries frequently begin to gel before leaving the pipeline so that a great deal of power is expended in pumping the slurries into the borehole.

It is the principal object of the present invention to provide a pipeline for conveying explosive slurries whereby the residence time of cross-linked slurries in the pipeline is minimised.

In order to achieve the above stated principal object, the present invention provides a pipeline having at the discharge end a collinear rigid tubular open-ended extension of approximately the same diameter, a turbine within the extension, a rotatable stirrer mounted for rotation by the turbine within the extension at the end thereof remote from the pipeline, and an inner tube of external diameter small in relation to the internal diameter of the pipeline extending along and within the pipeline to terminate in an outlet within the extension between the pipeline and the stirrer.

The present invention also provides a method of supplying cross-linked explosive slurries to the interior of narrow boreholes, wherein an explosive slurry without cross-linking agent incorporated therein is pumped through a pipeline having at the discharge end a collinear rigid tubular open-ended extension of approximately the same diameter, a turbine within the extension, and a rotatable stirrer mounted for rotation by the turbine within the extension at the end thereof remote from the pipeline, and wherein a cross-linking agent is supplied through an inner tube of external diameter small in relation to the internal diameter of the pipeline extending along and within the pipeline to an outlet within the extension between the pipeline and the stirrer.

The turbine is preferably a strip of material twisted about its longitudinal axis to resemble an auger extending internally along the extension over part of the length of the extension.

For convenience in manufacture and assembly, the extension is preferably formed in two parts which are detachably connected together in longitudinal alignment.

The outlet from the inner tube is preferably adjustable.

One practical arrangement of a pipeline according to the present invention will now be described with reference to the accompanying drawings.

IN THESE DRAWINGS

FIG. 1 is a side elevation;
FIG. 2 is a cross-section on the line 2—2 of FIG. 1; and
FIG. 3 is a cross-section on the line 3—3 of FIG. 1.

Referring now to the drawings, the pipe line comprises a flexible rubber pipe 4 three cm. in external diameter to convey explosive slurry from a point of supply to a borehole. Fixed to the end of the pipe in alignment therewith is a metal tubular extension 5 four cm. in external diameter and 27 cm. in length. A turbine 6, 25 cm. in length, constituted by a metal strip twisted about its longitudinal axis fits neatly within the extension and terminates in an axial arbor 7 at the end remote from the pipe 4. The arbor 7 extends through a central bearing 8 supported by a spider 9 mounted at the end of the extension 5 within a further metal tubular extension 10 four cm. in external diameter and 11 cm. in length screwed on to the end of the extension 5 in alignment therewith. The arbor 7 is fixed to the central shaft 10 of a stirrer 12, 7 cm. in length, having banks of radial vanes 13 fixed to the shaft at approximately 1 cm. intervals. The stirrer 11 is wholly located within the extension 10.

A nylon tube 14 one half cm. in external diameter extends within and along the pipe 4, to terminate in an outlet 15 fixed by a spider 16 within the extension 5, at the end of the turbine 6 adjacent to the pipe 4. A needle valve 17 permits adjustment of the size of the outlet.

In use, slurry devoid of cross-linking agent is pumped along the pipe 4 and through the extension 5, thereby rotating the turbine 6 and stirrer 12. Cross-linking agent is pumped through the inner tube 14 to pass with the slurry along the turbine 6 and to be mixed with the slurry by the stirrer 12 immediately before emerging from the extension 10 into the borehole.

I claim:

1. A pipeline for delivering cross-linked slurried explosives having at the discharge end a collinear rigid tubular open-ended extension of approximately the same diameter, a turbine within the extension, a rotatable stirrer mounted for rotation by the turbine within the extension at the end thereof remote from the pipeline, and means for delivering liquid cross-linking agent into the extension, said means including an inner tube of external diameter small in relation to the internal diameter of the pipeline extending along and within the pipeline to terminate in an outlet within the extension between the pipeline and the stirrer.

2. A pipeline according to claim 1, wherein the outlet from the tube is adjustable.

* * * * *